UNITED STATES PATENT OFFICE.

CARL GEIGE, OF BROICH, GERMANY.

PROCESS OF MAKING ARTIFICIAL WOOD FROM PEAT OR TURF.

SPECIFICATION forming part of Letters Patent No. 579,571, dated March 30, 1897.

Application filed June 20, 1894. Serial No. 515,139. (Specimens.) Patented in Germany August 10, 1893, No. 77,178; in Belgium May 29, 1894, No. 110,191; in England May 31, 1894, No. 10,585; in Austria June 15, 1894, No. 44/2,445; in Sweden October 5, 1894, No. 6,069, and in Norway October 6, 1894, No. 4,117.

*To all whom it may concern:*

Be it known that I, CARL GEIGE, a subject of the King of Prussia, Emperor of Germany, residing at Broich, near Mülheim-on-the-Ruhr, Germany, have invented certain new and useful Improvements in Processes of Making Artificial Wood from Peat or Turf, (for which I have obtained Letters Patent as follows: in Germany, No. 77,178, dated August 10, 1893; in Austria, No. 44/2,445, dated June 15, 1894; in Belgium, No. 110,191, dated May 29, 1894; in Great Britain, No. 10,585, dated May 31, 1894; in Norway, No. 4,117, dated October 6, 1894, and in Sweden, No. 6,069, dated October 5, 1894,) of which the following is a specification.

The present invention consists of a process for producing artificial wood from peat or turf and calcined gypsum.

The process is conducted in the following manner: Raw turf, such as moss turf, white turf, meadow turf, heath turf, or any other description of turf, is lixiviated with alkalies to free it of its acidity, originating from the humic acid, to such an extent that it will not turn litmus-paper red. The turf thus treated is then reduced by means of opening-machines, similar to those used in spinning, to fibers and to dust, and the mixture of the fibers and the dust is then agitated or shaken in a drum until a felt-like moist mass having its interstices filled out with the dust or powder is obtained. This moist mass is allowed to become partially dry, and is then intimately mixed with calcined gypsum or with a paste of water and calcined gypsum, in order to fill out the pores, the mixture being effected in ordinary mortar-mills such as are in common use. The whole is then placed in suitable molds and subjected to high hydraulic pressure within the said molds for a short space of time, say about one hour, until all water in excess, if any, has been removed. As soon as the water ceases to run off from the molds the mass is taken out of the latter and dried in a drying-room by an uninterrupted current of cold air produced by ventilators.

The high pressure to which the mass is subjected and its previous saturation with a paste of water and calcined gypsum, or the addition of calcined gypsum, which has filled out the pores of said mass, are sufficient to almost entirely destroy the hygroscopic properties of the mass. After having been allowed to become dry the mass may, as a precaution, be oiled or coated with a solution of resin and spirit.

The following proportions have been found advantageous in practice: two parts, by volume, of calcined gypsum; ten to twelve parts volume of water, and six to eight parts volume of turf.

When the felt-like mass, partially dry, is mixed with dry calcined gypsum and then subjected to pressure in a mold, the water in the peat mass combines with or is absorbed by the gypsum, so that hard solid plates are produced.

In manufacturing in large quantities for wholesale requirements, in which case the mass takes longer to work up, one part, by volume, of glue should be added to the above mixture eventually, with the addition of chromic acid or chromate of potassium, in order to prevent the gypsum from binding too quickly.

The artificial wood produced according to the present process offers considerable resistance to the influence of heat, cold, or pressure, and may be filed, sawed, planed, turned, cut, glued, colored, and very easily polished.

Doors, paneling, parquet furniture, stairs, and the like made of artificial wood produced according to the present process are cheaper than objects of the kind made of ordinary wood, and, above all, do not warp.

Having thus described my invention, what I claim as new, and desire to secure by Letters Patent, is—

1. A process for producing artificial wood, consisting in first lixiviating of its acidity raw turf, then reducing the same to fibers and dust, then shaking or agitating the mixture of the fibers and the dust until a moist felt-like mass is obtained having its interstices filled out with the dust, then intimately mixing the said mass with calcined gypsum and then subjecting the resultant mass to a high pressure, substantially as set forth.

2. A process for producing artificial wood, consisting in first lixiviating of its acidity, raw turf, then reducing the same to fibers and dust, then shaking or agitating the mixture of the fibers and the dust until a moist felt-like mass is obtained having its interstices filled out with the dust, then intimately mixing the said mass with a paste of calcined gypsum and water, after having allowed the said mass to partially dry and then subjecting the resultant mass to a high pressure, substantially as described.

3. A process for producing artificial wood consisting in first lixiviating raw turf, then reducing the same to fibers and dust, shaking or agitating the mixture of the fibers and the dust until a moist felt-like mass is obtained as specified, allowing the said mass to partially dry and then intimately mixing the same with a paste of calcined gypsum and water with an addition of glue in molds and subjecting the resultant mass to a high pressure and then drying it, substantially as described.

In testimony whereof I have signed my name to this specification in the presence of two subscribing witnesses.

CARL GEIGE.

Witnesses:
MATTH. VOLKENBORG,
VIROLUNS PROBST.